United States Patent Office 2,915,486
Patented Dec. 1, 1959

2,915,486

POLYESTER COMPOSITIONS, WATER-DISPERSIBLE POLYESTER-AMINOPLAST CONDENSATION RESINS MADE THEREFROM, AND METHODS FOR PRODUCING THEM

James P. Shelley, Drexel Hill, Pa., assignor to Rohm & Haas Company, Philadelphia, Pa., a corporation of Delaware No Drawing. Application March 5, 1956
Serial No. 569,221

5 Claims. (Cl. 260—21)

The present invention is concerned with new polyesters which are especially adapted to form new polyester-aminoplast condensation resins which are dispersible in water without the aid of emulsifying agents or dispersing agents. It is also particularly concerned with the production of such polyester-aminoplast condensation resins that are adapted to be used in aqueous systems for various applications as in coatings, adhesives, and so forth, and are especially useful for the coating of textile materials, and as binders in the pigment-printing and pigment-dyeing of textiles.

The production of water-borne oil-modified alkyd resins using air-drying oils as the effective means for converting coatings and other masses formed from such alkyds into insoluble condition is known. However, the curing action, depending upon oxidation during air-drying even when accelerated at elevated temperatures, is relatively slow. Alkyds have also been modified by coreaction with thermosetting resinous condensates, such as those of phenol-formaldehyde, urea-formaldehyde and melamine-formaldehyde. However, the products of such coreaction are generally insoluble in water, thereby requiring application from organic solvents with accompanying fire and health hazards, to say nothing of the greater expense usually entailed by the use of organic solvents as compared to aqueous or essentially aqueous systems. When such alkyd-thermosetting resin condensates have been modified heretofore by the inclusion of large proportions of hydrophilic groups in order to obtain water-dispersibility, films and other products obtained from aqueous systems containing such condensates are generally inadequately resistant to moisture for most practical uses or, when water-dispersibility is obtained by reduction in molecular weight of the condensate, films obtained from such compositions have generally been lacking in cohesion, flexibility, and toughness, so that they are generally of a character colloquially termed "cheesy."

Applicant has discovered that an alkyd-aminoplast condensation product can be obtained which has excellent curing qualties, produces films of good adhesion and hardness, and yet are self-dispersible in aqueous systems. The alkyd-aminoplast condensation products of the present invention may be generally characterized as the coreaction product of two components as follows:

(A) A special polyester having an average molecular weight of about 800 to 1500 containing hydroxyl groups available for condensation with the aminoplast and free carboxyl groups available for neutralization by means of ammonia, an amine, or a quaternary ammonium compound, and (B) An aminoplast soluble in such organic solvents as butanol, isopropanol and monoalkyl ethers of diethylene glycol in which the alkyl group is methyl, ethyl, or the like.

COMPONENT A

Component A is a special low molecular weight polyester containing hydroxyl groups adapted to enable its coreaction with the aminoplast (Component B) and some carboxyl groups for neutralization. The acid number of Component A should be between about 90 and about 100. This polyester is formed by first condensing a dibasic aliphatic acid having from 5 to 10 carbon atoms with a polyol, especially an aliphatic polyol having 2 to 10 carbon atoms, or a mixture of such polyols containing at least 25 mole percent of a polyol having three or more hydroxyl groups therein. For example, the polyol may contain up to 75 mole percent by weight of a diol, such as ethylene glycol, diethylene glycol, propylene glycol, dipropylene glycol, and trimethylene glycol, 1,3-butane-diol, 1,4-butane-diol, and 1,5-pentane-diol. Examples of the polyols containing more than two hydroxyl groups that may be used include glycerine, sorbitol, pentaerythritol, inositol, tetramethylolcyclohexanol, di- and poly-pentaerythritol, and so forth, but tri-methylolethane (by which is meant the compound of the formula $CH_3C(CH_2OH)_3$) is preferred. Preferably, the proportion of diol is not over 50 mole percent of the entire polyol component and, of course, the diol may be completely absent.

The aliphatic dicarboxylic acid that is used may be adipic acid, succinic acid, glutaric acid, sebacic acid or the like. Preferably it contains from 5 to 8 carbon atoms, but it may contain 4 to 18 carbon atoms.

The polyol and dibasic aliphatic acid are mixed in the proportion of 1.2 to 1.8 moles of polyol to each mole of acid, preferably 1.2 to 1.5 moles of polyol being used for each mole of acid. The mixture is heated to a temperature within the range of about 200° to 260° C. in the presence of an inert gas, such as carbon dioxide, nitrogen, argon, helium, when atmospheric or higher pressures are employed. If desired, a reduced pressure may be present during the reaction to remove the water formed on esterification and to favor a shift in the equilibrium toward the esterification product. Pressures of 20 to 50 mm. or more absolute pressure may be used. Optionally, an esterification catalyst may be used, such as 0.1 to 1% of sulfuric acid, toluenesulfonic acid, zinc chloride, or phosphorus pentoxide. Such catalyst, however, is not necessary. The reaction is carried out until the acid number is reduced to a value of 10 or less. Preferably, the acid number is reduced to a value of less than 5.

The polyester obtained has terminal hydroxyl groups and also some hydroxyl groups at intervals along the polyester molecule.

Instead of using the free dibasic acid itself as one of the starting materials in this esterification reaction, there may be used the lower alkyl diesters of the dibasic acids, such as the dimethyl or diethyl esters. Reaction in this case involves an ester interchange and sometimes has the advantage of yielding a product having less color. In this procedure, the alcohol liberated is boiled off.

Optionally, the polyester may be modified with a fatty acid having 8 to 30 carbon atoms, such as lauric acid, stearic acid, oleic acid, linoleic acid, linolenic acid, palmitic acid, and ricinoleic acid. The modification may be effected by directly reacting the fatty acid with the polyol or with the hydroxyl-containing polyester; alternatively, the same result may be effected by transesterification, in which case an ester of the fatty acid, such as an ester thereof with glycerol, is reacted with the polyol or the hydroxyl-containing polyester in the presence of a suitable catalyst, such as an alkali metal alkoxide. There should be used from 1 to 3 moles of polyol or polyol mixture to each mole of the fatty acid (or the equivalent thereof in the case of an ester thereof when transesterification is employed); preferably there is used from about 1.2 to 1.5 moles of polyol to each mole of acid or equivalent of ester. When modification with a fatty acid is resorted to, it is preferable to react the monobasic fatty acid or its ester (in the case of transesterification) with the polyol or a part of it before the polyol is reacted with the dibasic acid. Thus, when a modified polyester is desired, the fatty acid or ester thereof, such as a fat or oil, is first mixed with the polyol or polyol mixture and the esterification or transesterification with the monobasic fatty acid is carried out under the same conditions as stated hereinabove in respect to the esterification with a dibasic acid. Thus, the temperature may be from 200° to 260° C.; the pressure from 20 mm. absolute up to atmospheric or higher, an inert gas being used preferably at atmospheric or higher pressures. Optionally, an esterification or transesterification catalyst may be used as before. The reaction is continued until the acid number reaches a value of 10 or less. Preferably, it is continued until the acid number reaches a value of less than 1. It is desirable that the monobasic acid be completely bound up in the ester product, and to this end the most desirable condition is attained when the acid number approaches or reaches a value of zero. The esterification product obtained from the polyol and monobasic acid is then mixed with the dibasic acid and any additional amount of polyol needed to bring the proportion of polyol used in the entire condensation reaction to a proportion of between 1.2 to 1.8 moles of polyol to one mole of the dibasic acid. This esterification reaction is continued under the same conditions as stated hereinabove in describing the preparation of the simple polyester unmodified with monobasic acid. As in the previous case, the reaction is continued until the acid number of the product is reduced to a value of 10 or less and preferably to a value of less than 5. The oil-modified polyester in this instance has some of its hydroxyl groups esterified with monoacyl radicals derived from the fatty acid. Of course, a mixture of fatty acids may be employed instead of a single one and similarly a mixture of dibasic acids may be employed instead of a single one whether an oil-modified polyester or an unmodified polyester is to be prepared up to this point.

The unmodified or oil-modified polyester thus prepared is then reacted with o-phthalic acid or o-phthalic acid containing lower alkyl substituents in the benzene ring, such as methyl, ethyl, propyl, or butyl substituents or with the anhydrides thereof. The use of the anhydrides is preferred because of their solubility in the polyester at this stage and the ease of reaction of one carboxylic group thereof, apparently without appreciable reaction of both such groups which would lead to cross-linking, water-insolubility, and gelation. Any other polycarboxylic acid, such as isophthalic acid or terephthalic acid, has not been found satisfactory in this phase of the preparation of the polyester, either because of insolubility and lack of reactivity therein, or, in some instances, because of rapid cross-linking to a water-insoluble, gel stage. The amount of the phthalic acid or its derivative or anhydride used is in the proportion of 2 to 3.5 moles for every 3 moles of the polyol. When the polyol consists entirely of one containing 3 hydroxyl units, it is preferred to use approximately 2 moles of the phthalic acid for 3 moles of the polyol. The reaction with the phthalic acid is believed to provide terminal carboxyphenyl groups on the polyester molecules. The reaction of the mixture of phthalic acid with the unmodified or oil-modified polyester may be effected at a temperature of 150° to 170° C. for a period of 1 or 2 hours. The reaction is continued until the acid number is reduced to 100 but is stopped before the acid number is reduced appreciably below 90. When the desired acid number within the range of 90 to 100 is reached, the reaction mixture is cooled to a temperature below 60° C. and preferably down to 20° or 30° C. to stop the esterification reaction. The reaction product thereby obtained provides Component A for reaction as will be described hereinbelow.

The polyester itself may be used as the sole binder for making varnishes, paints, and enamels, especially when it contains, combined in its molecule, a drying oil. Similar coating compositions may be obtained by mixing the polyester or co-reacting it with other binder materials, such as drying oils, natural resins, shellac, and aminoplasts. It is especially useful for the production of water-borne condensation products with certain aminoplasts described as Component B hereinafter.

COMPONENT B

Component B consists of an alkylated polymethylol nitrogen compound obtained by the reaction of formaldehyde or substances yielding formaldehyde and certain alcohols on a nitrogen compound selected from the group consisting of urea, thiourea, and triazines including guanamines, such as acetoguanamine and benzoguanamine, melamine and substituted melamines. The alkylation should be that resulting from an alcohol having from 3 to 6 carbon atoms, such as isopropanol, n-propanol, butanol, pentanol, hexanol, or cyclohexanol, so that the aminoplast will be soluble in such solvents as butanol, isopropanol, pentanol and the like. Examples of the substituted melamines include N,N-dialkylmelamines in which the alkyl group has from 1 to 4 carbon atoms, e.g. methyl, ethyl, propyl, isopropyl, and n-butyl, also N,N'-dialkylmelamines in which the alkyl group may be any of those just stated, N-monoalkylmelamines in which the alkyl group may be any of those just stated. The preparation of the alkylated polymethylol nitrogen-containing compound is in itself no part of the present invention since these condensation products are well-known and available commercially.

CONDENSATION OF COMPONENTS A AND B

The condensation product of Components A and B may be obtained by reacting a mixture of them in organic solvents at a concentration of 50% to 90% solids; for example, Component A may be dissolved in xylene, benzene, toluene, ketones, such as dioxane or methylethyl ketone, or in monoalkyl ethers of ethylene glycol, such as the monobutyl ether, butanol or mixtures of such solvents. Similarly, the aminoplast (Component B) may be dissolved in butanol or a mixture of butanol and xylene or in any other mixture of the various solvents just mentioned. Component A and Component B are reacted in proportions of about 40 to 60 parts by weight of Component A to about 60 to 40 parts by weight of Component B. Preferably, the concentration of the reactants in the organic solvent, and consequently of the reaction product therein, is maintained as high as possible consistent with manipulability which depends upon the viscosity. The reaction of the mixture is effected in the organic solvent solution at a temperature of 50° to 120° C., and preferably at a temperature of 70° to 90° C., at atmospheric pressure. The reaction is carried out until a sample to which an amine (such as 10% of triethylamine on weight of condensate solids) is added is soluble in water. Generally, the reaction is accompanied by an advance in viscosity of about 3 to 10 poises when measured at 60% solids concentration in any particular organic solvent at room temperature.

The reaction product is cooled below 60° C., such as to 25° to 55° C., and then it is neutralized or at least partially neutralized with ammonia, an amine, or a quaternary ammonium compound. If desired, a small proportion of the neutralizing component may be a fixed base, such as potassium or sodium hydroxide, or carbonates. However, it is preferred to use as the entire neutralizing agent either ammonia, a volatile amine or a quaternary ammonium compound or a mixture of 2 or 3 of such materials. When ammonia is the neutralizing agent, it is generally introduced as an aqueous solution. Preferably the ammonia is rather concentrated when it is desired to store or ship the product in order to save bulk. However, the ammonia may be sufficiently dilute to directly produce an aqueous solution or dispersion of the condensation product of the present invention having the desired solids concentration for direct application, such as in coatings, adhesives, impregnants, and so forth. When an amine or a quaternary ammonium compound is used as the neutralizing agent, it may be added without adding water so that the neutralized condensation product of the invention is essentially anhydrous but is capable of practically unlimited dilution with water without being coagulated. Such amines as monoethylamine, triethylamine, dimethylamine, trimethylamine, and morpholine are quite suitable as neutralizing agents. Also quaternary ammonium compounds, such as choline, trimethylbenzylammonium chloride, methylpyridinium chloride, may be used for neutralization. As in the case of the amines, they may be used without the addition of water so that the product is obtained as a substantially anhydrous solution which is dilutable with water to practically unlimited extent. If desired, the amines or the quaternary ammonium compounds may be introduced as aqueous solutions and, in the case of ammonia, a dilution may be such as to provide concentration of the condensation product desired for application in coatings, adhesives and so forth. On the other hand, the substantially anhydrous products obtained by neutralization by an amine or a quaternary ammonium compound may be stored or shipped in that concentrated form and then diluted with water for application at the point of its destined use.

The condensation product of the present invention thereby obtained may be used for the purpose of providing clear coatings, impregnants, or adhesive compositions, or it may be pigmented. Examples of pigments that may be used include clays, kaolin, china clay, satin white, titanium dioxide, lithopone, barium sulfate, p-toner red, chrome green, ultramarine blue and the like. The amount of pigment that may be incorporated may be from 10% to 250% by weight of the condensation product. The pigment may be worked into the organic solvent solution of the condensation product before or after neutralization, or it may be worked into aqueous solutions thereof having any desired concentration of the condensation product. It is characteristic of the composition of the present invention that no curing catalyst need be added to accelerate the insolubilization by baking after application of the coating or the impregnant.

When a clear coating or impregnant is desired and the composition does not contain a pigment, the organic solvent solution of the condensation product obtained by neutralization with an amine or quaternary ammonium compound or the neutralized aqueous medium obtained by treatment with ammonia may be applied as a coating without dilution. However, it is preferred to reduce the concentration by the addition of water until a concentration of 5% to 40% solids is obtained at which concentration the composition may be applied as a coating, impregnant or otherwise. Any suitable manner of impregnation or coating may be employed, such as dipping, roller-coating, knife-coating, or spraying; spraying usually being effected at 20% to 25% solids. The composition may be applied to wood, metal, glass, to textile fabrics as in pigment printing or dyeing, paper, cardboard, leather, asbestos-cement products, asphalt tile, linoleum, cork, masonry, including bricks, stone, ceramic tile, and other clay products. After application of the coating or impregnation, the condensate is cured by heating at temperatures of 110° C. to 350° C., such as by baking at 250° to 350° C. for one minute to one-half hour whenever the substrates permit such temperature. Substrates, such as wood, which cannot stand such temperatures may be cured by heating at 60° C. (140° F.) for a period of 8 to 24 hours. In the application to textiles, a curing temperature of 240° F. to 300° F. for a period of about ten minutes to an hour is generally adequate. The baking operation at high temperatures may be preceded by an ordinary drying step at room temperature or at elevated temperatures.

The composition is particularly useful in the coating of textiles, such as for the stiffening thereof, more or less permanent warp-sizing thereof, imparting a crisp hand thereto, and for the printing or pigment-dyeing of textiles. For these purposes, and especially the latter, from ½ to 5% of a water-soluble thickener may be added, such as gum tragacanth, water-soluble cellulose ethers, sodium alginate, polyvinyl alcohol, or partially saponified poly(vinyl acetate). Wetting agents, penetrants, and so on, such as soaps, especially triethanolamine stearate, nonionic agents such as higher alkylphenoxypolyethoxyethanols in which the alkyl has eight to eighteen carbon atoms (e.g., t-octyl) and from 10 to 50 or more oxyethylene units are present and cationic surfactants, such as octadecylbenzyldimethylammonium chloride, may be included in amounts of from ½ to 5% by weight.

These aqueous compositions may be mixed with aqueous dispersions of water-insoluble linear emulsion polymers of one or more monoethylenically unsaturated polymerizable compounds, such as the acrylic, α-alkyl acrylic and α-haloacrylic esters of saturated monohydric alcohols, especially of saturated aliphatic monohydric alcohols, e.g., the methyl, ethyl, propyl, isopropyl, butyl, isobutyl, and amyl esters of acrylic, methacrylic, ethacrylic, propacrylic, chloroacrylic, bromoacrylic acids; the phenyl, benzyl, and phenylethyl esters of the aforementioned acids; vinyl aromatic compounds, e.g., styrene, alpha-methyl styrene, dimethylstyrenes, dichlorostyrenes, the various cyanostyrenes, the various methoxystyrenes, vinyl naphthalenes, e.g. 4-chloro-1-vinyl-naphthalene; vinyl and vinylidene halides, e.g. vinyl and vinylidene chlorides, bromides, etc.; alkyl vinyl ketones, e.g., methyl vinyl ketone, ethyl vinyl ketone, methyl isopropenyl ketone, etc.; itaconic diesters containing a single $CH_2=C<$ grouping, e.g., the dimethyl, diethyl, dipropyl, dibutyl and other saturated aliphatic monohydric alcohol diesters of itaconic acid, diphenyl itaconate, dibenzyl itaconate, ditolyl itaconate, di-(phenylethyl) itaconate; vinyl, allyl and methallyl esters of saturated aliphatic monocarboxylic acids, e.g. vinyl, allyl and methallyl acetates, vinyl, allyl and methallyl propionates, vinyl, allyl and methallyl valerates; vinyl thiophene; nitriles containing a single $CH_2=C<$ grouping, e.g. acrylonitrile, methacrylonitrile, and minor amounts (up to 1%) of vinyl pyrrole, vinyl pyridine, N-dialkyl acrylamides, e.g. N-dimethyl, -diethyl, -dipropyl, -dibutyl, -diamyl, -dihexyl, and -dioctyl acrylamides. These polymers may also contain small amounts up to 5% or 10% of such other hydrophilic comonomers as acrylic acid, methacrylic acid, itaconic acid.

The compositions of the present invention are characteristically aqueous and contain no volatile organic solvent. They accordingly involve no fire hazard, or health hazard as a result of toxicity. Storage and use of the compositions accordingly require the simplest of facilities, no elaborate protective or solvent-recovery systems being required. They are also substantially odorless or, at the worst, have but a slight, inoffensive odor.

The coloring composition may be applied to textiles of all kinds, including woven, knitted, or other types of textile fabrics, such as felts. The fibers or yarns of the fabric may be formed of cotton, rayon, silk, wool, linen; cellulose esters, such as cellulose acetate; proteinaceous types, such as casein, soya bean protein; also linear polymeric types, such as the polyamides (nylon), polyesters, such as polyglycol terephthalate (Dacron); and the vinyl types, such as polyethylene, polyvinyl chloride, polyvinylidene chloride, polyacrylonitrile; copolymers of vinyl chloride with vinyl acetate, acrylonitrile, vinylidene chloride or the like; copolymers of vinylidene chloride with vinyl acetate, ethylene or acrylonitrile; copolymers of acrylonitrile with vinyl acetate, methacrylonitrile, vinyl pyridines, or with mixtures of the latter monomers.

The films obtained from the condensate of the present invention are characterized by excellent adhesion to the substrate, good flexibility adapting it to such flexible bases as leather, paper and the like, and toughness which renders the coating or film resistant to shattering and severe penetration on impact. In the field of application as baking finishes for washing machines, refrigerators, kitchen ranges and automobiles, they may be applied as one component of a coating, such as the top coat, over other priming finishes, or two or more coatings of the condensation product of the present invention may be applied, one over the other, to provide the entire finish if desired.

In the following examples, which are illustrative of the invention, the parts are by weight unless otherwise specified:

Example 1

Into a reaction vessel, there are introduced 292 grams of adipic acid (2.0 moles) and 360 grams of trimethylolethane (3 moles). Heat and reduced pressure are applied and the batch held at 230° C. until the acid number value falls below 4.0. The reaction mixture is then cooled to ca. 160° C., vented and 296.0 grams of o-phthalic anhydride (2.0 moles) is charged. The mixture is heated to 150° to 160° C. at atmospheric pressure and held at this temperature until the acid number of the batch falls to ca. 100. At this point, full cooling is applied to the batch and sufficient xylol is charged to adjust the solids content of the batch to ca. 85%.

Example 2

The procedure of Example 1 is repeated replacing the adipic acid with 404 grams of sebacic acid (2 moles) and the polyol with 332 grams of glycerine (3.6 moles).

Example 3

The procedure of Example 1 is repeated replacing the adipic acid with 236 grams of succinic acid (2 moles) and the polyol with 437 grams of sorbitol (2.4 moles).

Example 4

The procedure of Example 1 is repeated replacing the adipic acid with 264 grams of glutaric acid (2 moles) and the polyol with 340 grams of pentaerythritol (2.5 moles).

Example 5

The procedure of Example 1 is repeated replacing the polyol with a mixture of 233 grams of diethylene glycol (2.2 moles) and 96 grams of trimethylolethane (0.8 mole).

Example 6

200 grams (1.0 mole) of lauric acid and 156.0 grams (1.3 moles) of trimethylolethane are heated under reduced pressure (total pressure=ca. 30 mm. Hg) to a temperature of 230° C. The mixture is held at this temperature until the acid number of the batch (mg. KOH required to neutralize 1.0 gram) falls below 1.0. The system is then cooled to below 170° C., vented and 292.0 grams of adipic acid (2.0 moles) and 204.0 grams of trimethylolethane (1.7 moles) are charged. Heat and reduced pressure are re-applied and the batch again held at 230° C. until the acid number value falls below 4.0. The reaction mixture is then cooled to ca. 160° C., vented and 296.0 grams of o-phthalic anhydride (2.0 moles) is charged. The mixture is heated to 150° C. to 160° C. at atmospheric pressure and held at this temperature until the acid number of the batch falls to ca. 100. At this point, full cooling is applied to the batch and sufficient xylol is charged to adjust the solids content of the batch to ca. 85%.

Example 7

The procedure of Example 6 is followed substituting 364 grams of sebacic acid (1.8 moles) for the adipic acid.

Example 8

The procedure of Example 6 is followed substituting 138 grams of diethylene glycol (1.3 moles) for the first charge of trimethylolethane.

Example 9

The procedure of Example 6 is followed substituting 264 grams of glutaric acid (2 moles) for the adipic acid and 120 grams of glycerol (1.3 moles) for the first charge of trimethylolethane.

Example 10

The procedure of Example 6 is followed substituting 427 grams of stearic acid (1.5 moles) for the lauric acid.

Example 11

Charge 444 grams of soybean oil to a reaction vessel along with 120 grams of trimethylolethane (1.0 mole). Heat is applied to the mixture and nitrogen gas is sparged through the batch continuously throughout the reaction. At 130° C., 1.0 gram of a 25% solution of sodium methylate in methanol is added to the batch. The heating is continued. At 165° C., 0.5 gram of triphenylphosphite is charged to the batch. Heating is continued to a batch temperature of 230° to 240° C. The mixture is held in this temperature range about five minutes until a clear "pill" is obtained in cooled droplets from a rod dipped into the mixture. The mixture is then cooled to approximately 180° C., at which point there is charged 438 grams (3 moles) of adipic acid and also another 360 grams (3 moles) of the trimethylolethane, and heating is once more resumed. The batch is heated to 260° C. and held at this temperature until the acid number drops to less than 2.0. Then the batch is cooled to 170° C. and 444 grams (3 moles) of phthalic anhydride are charged. Heating is again resumed. The batch is heated to 150° to 160° C. until the acid number drops to 90 to 100, at which point the reaction is probably complete and full cooling is applied. At a temperature of 110° C., the batch is diluted to about 85% solids with 300 grams of xylol.

Example 12

The procedure of Example 11 is repeated substituting 444 grams of coconut oil for the soybean oil.

PREPARATION OF WATER-BORNE CONDENSATION PRODUCTS

Example 13

A mixture of 100 grams of a 60% solution in xylene of a butylated polymethylolmelamine and 100 grams of the polyester product of Example 1 is stirred at room temperature for about one-half hour to insure reasonably thorough mixing before any heat is applied. The mixture is then heated to 55° to 60° C. and held in this range for one-half hour. At the end of this time, reaction is stopped by applying cooling to the batch and adding an amount of concentrated 28% aqueous $NH_3$ or triethylamine (100%) equal to 20% of the weight of polyester solids present.

The product is then diluted with water to 25% solids concentration and sprayed on cellophane and on glass and metal panels, dried and baked for 10 minutes at 240° F. Clear glossy coatings are obtained which are water-resistant, hard, and adhere well to the substrates on which coated.

Example 14

The procedure of Example 13 is followed substituting 120 grams of the polyester of Example 6 for the polyester of Example 1 therein used.

The co-reaction product obtained after neutralization with triethylamine is mixed with about 240 grams of a paste of titanium dioxide containing 2 grams of a nonionic dispersing agent, then diluted with water to 10% solids concentration and thickened by the addition of 0.2% of sodium alginate on the total weight of the dispersion. The resulting dispersion is printed on textile fabrics of cotton, rayon and nylon, dried, and baked at 240° F. for ten minutes. The coatings adhere well to the fabrics and exhibit good covering power.

*Example 15*

The procedure of Example 14 is repeated in successive runs substituting for the polyester there used 120 grams of each of the polyesters of Examples 2 to 5 and 7 to 12. Similar glossy, hard, water-resistant coatings are obtained.

*Example 16*

The procedure of Example 14 is followed except that 120 grams of the polyester of Example 11 is substituted for the polyester of Example 6.

Glossy, hard, water-resistant coatings are obtained on metal and glass panels.

*Example 17*

The procedure of Example 13 is repeated except that 100 grams of a 50% solution of a butylated dimethylolurea is substituted for the melamine resin. Similar clear, glossy coatings are obtained.

*Example 18*

The procedure of Example 13 is repeated except that 100 grams of a 45% solution of N,N'-diisopropoxymethyl-imidazolidinone-2 is substituted for the melamine resin. Similar clear, hard and glossy coatings on metal bases are obtained.

*Example 19*

The procedure of Example 14 is repeated substituting 100 grams of a 60% solution in xylene of a butylated polymethylol-N,N-dimethylmelamine. Similar hard, glossy coatings are obtained.

It is to be understood that changes and variations may be made without departing from the spirit and scope of the invention as defined in the appended claims.

I claim:

1. A composition comprising an aqueous dispersion of a salt of a condensation product of (1) about 40 to 60 parts by weight of a xylene-soluble butylated polymethylol melamine with (2) about 40 to 60 parts by weight of a polyester defined hereinafter, said dispersion being obtained by heating a mixture of (1) and (2) above in the proportions stated, to effect reaction therebetween, in an organic solvent at a total concentration of (1) and (2) in the range of 50 to 90% by weight and subsequently neutralizing the reaction mass with a member selected from the group consisting of aqueous ammonia and water-soluble, volatile amines, said polyester containing hydroxyl groups and free carboxyl groups and having an average molecular weight of about 800 to 1500 and an acid number between about 90 and about 100, the polyester being a condensation product of an aromatic member selected from the group consisting of o-phthalic acid and its anhydride with a condensation product selected from the group consisting of (a) polyesters having an acid value of not over 10 and obtained from the condensation of a mixture of at least one dibasic aliphatic acid having 5 to 10 carbon atoms with at least one aliphatic 2-carbon to 10-carbon atom polyol, said polyol consisting of polyol molecules having 2 to 6 hydroxyl groups and containing at least 50 mole percent of trimethylolethane, the proportions in the mixture being in the range of 1.2 to 1.8 moles of polyol to each mole of acid, and (b) polyesters as obtained in (a) but modified by condensation with a fatty acid having 8 to 30 carbon atoms, said modified polyesters having an acid value of not over 10; the proportion of the aromatic member to the total polyol being in the range of 2 to 3.5 moles of the former for each 3 moles of the latter.

2. A composition as defined in claim 1 in which neutralization is effected by an aqueous solution of ammonia.

3. A composition as defined in claim 1 in which the polyol consists of trimethylolethane, the dibasic acid is adipic acid, the polyester is modified by soybean oil acids, and neutralization is effected with aqueous ammonia.

4. A composition as defined in claim 1 in which neutralization is effected with triethylamine.

5. A composition as defined in claim 1 in which the polyol consists of trimethylolethane, the dibasic acid is adipic acid, the polyester is modified by soybean oil acids, and neutralization is effected with triethylamine.

References Cited in the file of this patent

UNITED STATES PATENTS

| | | |
|---|---|---|
| 1,098,776 | Arsem | June 2, 1914 |
| 2,116,125 | Rosenblum | May 3, 1938 |
| 2,479,090 | Wohnsiedler | Aug. 16, 1949 |
| 2,681,894 | Hoenel | June 22, 1954 |
| 2,729,610 | Ehring et al. | Jan. 3, 1956 |
| 2,811,493 | Simon et al. | Oct. 29, 1957 |